United States Patent
Schulze

(10) Patent No.: US 7,454,942 B2
(45) Date of Patent: Nov. 25, 2008

(54) HOLLOW MOLDED PART WITH CLOSED CROSS-SECTION AND A REINFORCEMENT

(75) Inventor: Bernd Schulze, Niederdorf (DE)

(73) Assignee: fischer Hydroforming GmbH, Menden (DE)

( * ) Notice: Subject to any disclaimer, the term of this patent is extended or adjusted under 35 U.S.C. 154(b) by 5 days.

(21) Appl. No.: 10/781,135

(22) Filed: Feb. 17, 2004

(65) Prior Publication Data

US 2004/0166354 A1    Aug. 26, 2004

(30) Foreign Application Priority Data

Feb. 17, 2003    (DE) .............................. 203 02 615 U

(51) Int. Cl.
*B21D 26/02* (2006.01)
*B21C 37/30* (2006.01)

(52) U.S. Cl. ............... 72/370.22; 72/370.25; 72/370.14

(58) Field of Classification Search . 72/370.13–370.15, 72/370.22–370.25, 61
See application file for complete search history.

(56) References Cited

U.S. PATENT DOCUMENTS

| 231,941 | A | * | 9/1880 | Self et al. ........................ 54/56 |
| 2,267,623 | A | * | 12/1941 | Self et al. .................... 239/549 |
| 4,157,654 | A | * | 6/1979 | Kahlow et al. ............ 72/370.15 |
| 5,074,555 | A | * | 12/1991 | Meredith ................. 72/370.15 |
| 5,823,031 | A | * | 10/1998 | Campbell et al. .............. 72/58 |
| 5,894,753 | A |  | 4/1999 | Sachot et al. |
| 6,282,934 | B1 |  | 9/2001 | Bikert et al. |
| 6,349,521 | B1 | * | 2/2002 | McKeon et al. .......... 72/370.23 |
| 6,434,990 | B1 | * | 8/2002 | Juedes ............................. 72/61 |
| 6,513,243 | B1 | * | 2/2003 | Bignucolo et al. ............. 72/61 |
| 6,748,786 | B2 | * | 6/2004 | Ooyauchi et al. ........ 72/370.14 |
| 6,834,522 | B2 |  | 12/2004 | Leppin et al. |
| 6,872,061 | B2 | * | 3/2005 | Lemay et al. ................. 418/48 |

FOREIGN PATENT DOCUMENTS

| CA | 2498354 | 4/2003 |
| DE | 4106501 A1 | 9/1992 |
| DE | 19715961 C2 | 10/1998 |
| DE | 19518946 A1 | 11/1998 |
| DE | 19718853 A1 | 11/1998 |
| DE | 19755925 A1 | 6/1999 |
| DE | 20206524 U1 | 8/2002 |
| DE | 10126183 A1 | 12/2002 |
| WO | 9965628 | 12/1999 |
| WO | 0012240 | 3/2000 |

* cited by examiner

*Primary Examiner*—Derris H. Banks
*Assistant Examiner*—Teresa Bonk
(74) *Attorney, Agent, or Firm*—Horst M. Kasper

(57) ABSTRACT

The invention relates to a hollow molded part with a closed cross-section and a reinforcement, wherein the hollow molded part is formed as a single piece and exhibits a blank mold, with the first region (1) with a first starting outer diameter (D1) and the starting wall thickness (b1), and at least a second region (2) with an outer diameter reducing in comparison to the starting outer diameter (D1) and having an increased wall thickness in comparison to the starting wall thickness (b1), wherein the increased wall thickness forms a reinforcement.

19 Claims, 2 Drawing Sheets

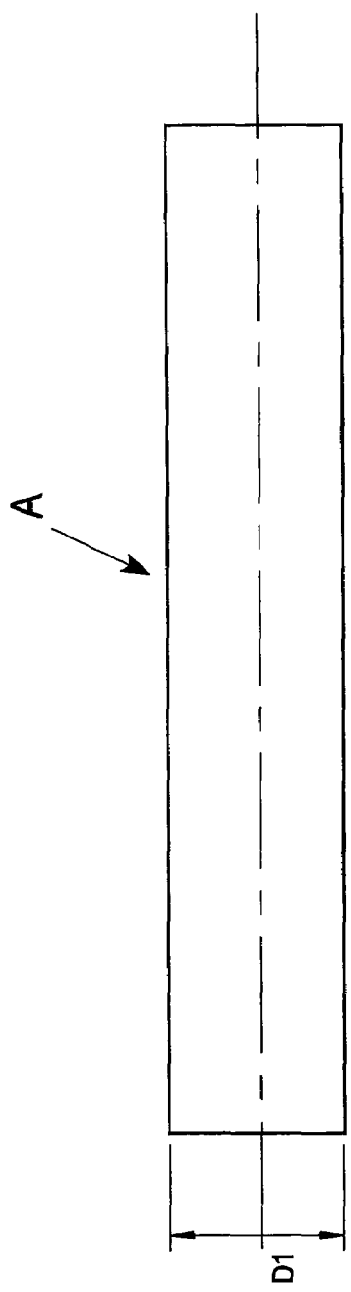
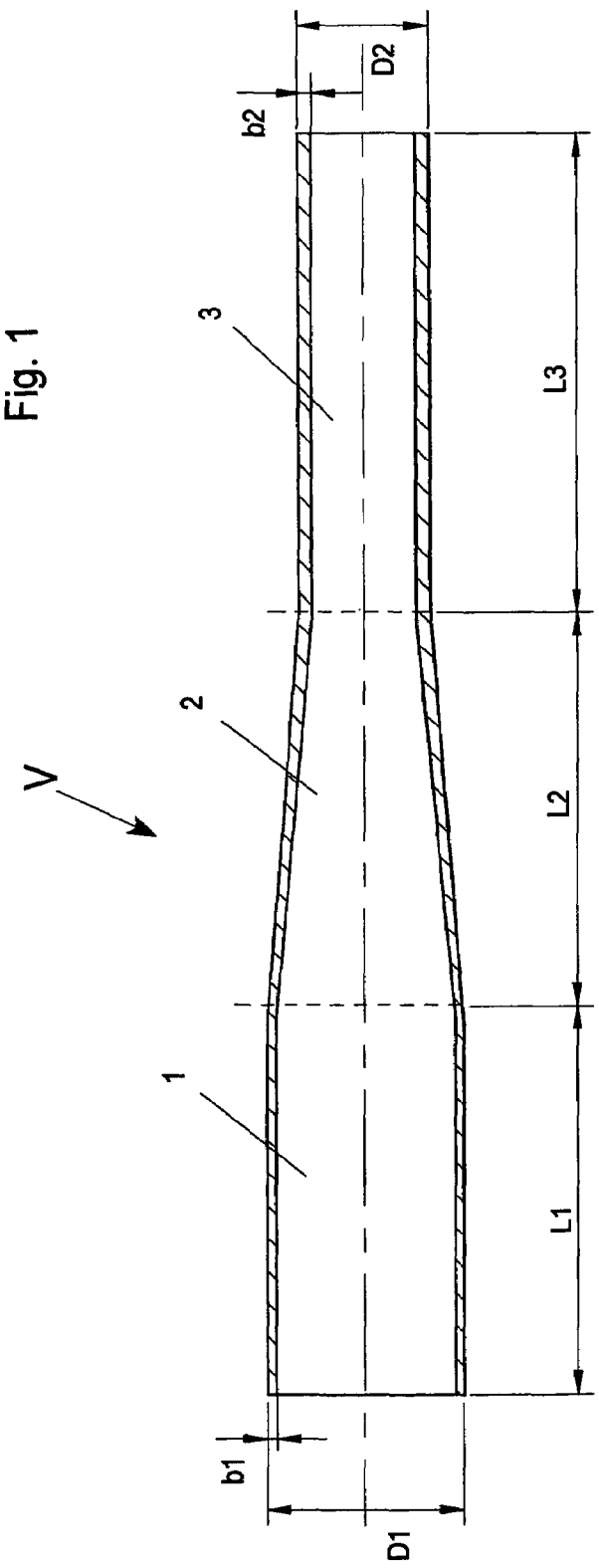

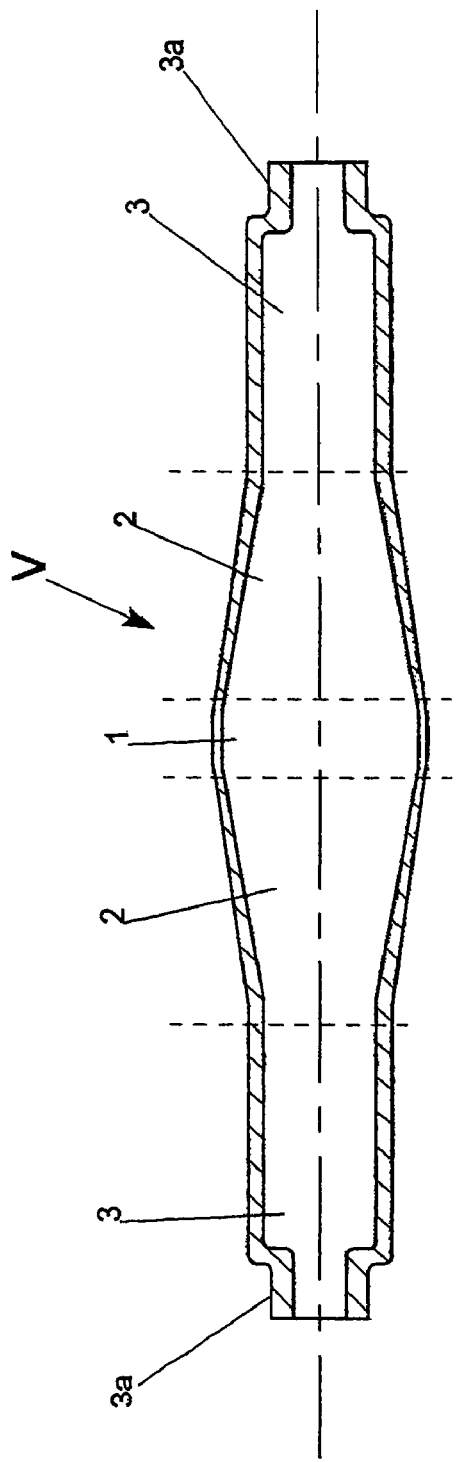
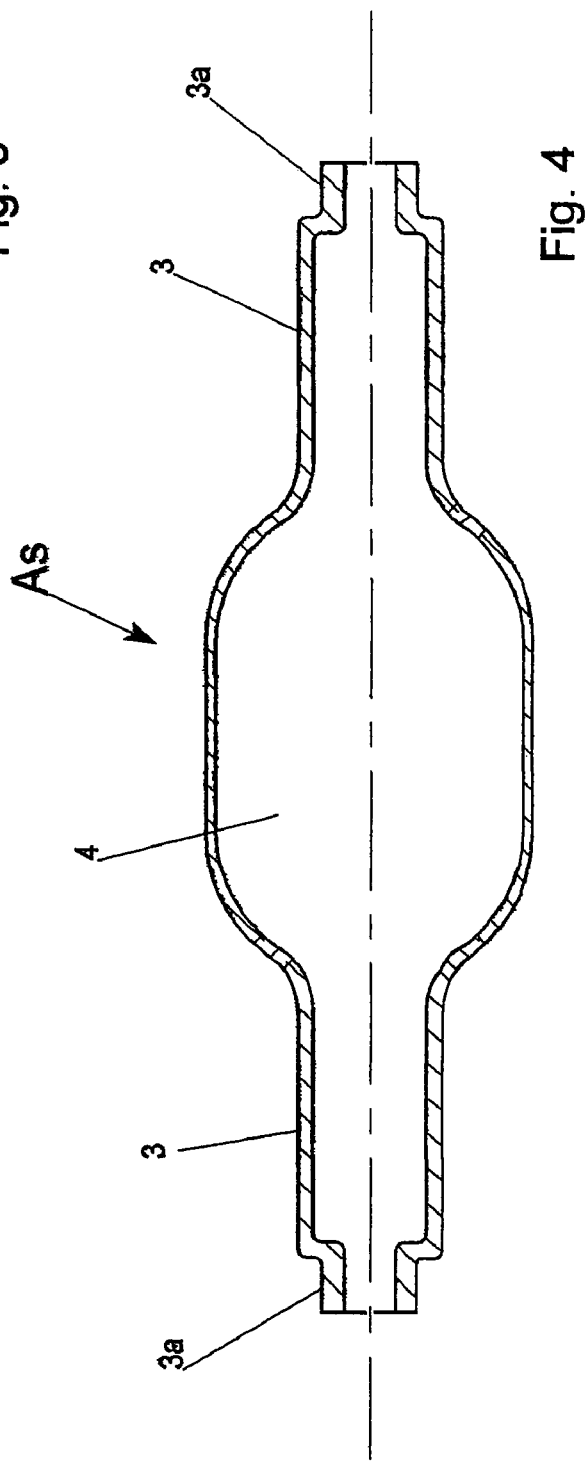

HOLLOW MOLDED PART WITH CLOSED CROSS-SECTION AND A REINFORCEMENT

BACKGROUND OF THE INVENTION

1. Field of the Invention

The Invention relates to a hollow molded part in the shape of an A-column for a motor vehicle made of a metallic material produced by inner high pressure metal forming out of a mold blank and to a method of production of the hollow molded part, wherein the hollow molded part exhibits a closed cross-section and a reinforcement according to the preamble of the patent claims.

2. Brief Description of the Background of the Invention Including Prior Art

A vehicle structural member or, respectively, a hollow molded part with closed cross-section is known from the German printed Patent document DE 19518946 A1, wherein the vehicle structural member or, respectively, the hollow molded part is formed with at least two component parts connected to each other. The term closed cross-section is associated with the circumference of the hollow mold part closed in itself. This hollow molded part represents a front column or, respectively, an A-column of a motor vehicle body and is formed out of an outer plate, a column stiffening and an inner column made of light metal. The reinforcement element is here disposed within the region of the closed cross-section of the vehicle structural member. It is furnished to attach several individual elements, such as for example pipes, plates, or the like along the hollow reinforcement element for further increasing the strength.

A solution is described in the German printed Patent document DE 10126183 A1, wherein a stiffening element is disposed in the inner chamber of the hollow molded part, wherein the stiffening element is connected to the hollow molded part and wherein the stiffening element extends through a recess of the hollow molded part into the inner space of the hollow molded part. The frame structure of a vehicle is described in the German printed Patent document DE 20 20 6524 U1, wherein a tubular frame part is furnished and wherein a sheet metal component part is furnished at the outer circumference of the tubular frame part for reinforcement of the frame structure. The disadvantage of this solution comprises the multipart construction and the therewith associated high production expenditure.

The body of a motor vehicle is described in the German printed Patent document DE 4106501 A1, wherein a part of the supporting structure of the body is composed out of two extruder profiles open relative to each other, and wherein the extruder profiles exhibit a closed cross-section after a connection to each other. The extruder profiles are here weight optimized based on shape and wall thickness corresponding to the expected requirements as to stiffness. The multiple part construction of the respective frame part is here also disadvantageous.

The U.S. Pat. No. 6,553,243 B1 to Bignucolo et al. describes a method for the production of a front axle of a motor vehicle. A first pre-form with the center cylindrical region 3 is here produced out of a section by a radial forming method, wherein the center cylindrical region 3 exhibits two cylindrical ends 4, wherein the diameter of the two cylindrical ends 4 is smaller than the diameter of the center region 3. A frustro-conical shaped region 5 extends between the center cylindrical region 3 and each cylindrical end region 4. A second pre-form is produced by having the first pre-form pressed or upset in a press such that an elliptical cross-section 6b is generated in the center region 3, wherein a recess 6b is present at the two ends of the elliptical cross-section 6b. Then according to a further pre-form step, a square cross-section 7a is formed in the center region.

Finally the production of the front axle occurs by inner high-pressure forming. This method requires overall four forming stages in order to form the front axle. The production of an A-column of a motor vehicle is not possible with the method according to Bignucolo et al., since a relatively strong bending is present in connection with the A-column and since Bignucolo et al. do not furnish a bending method.

A solution is described U.S. Pat. No. 5,823,031, by way of which method an expanding and bending of a tube becomes possible. The bent region joins at the expanded region. A wall thickness increase is not possible with the solution of U.S. Pat. No. 5,823,031. Also according to U.S. Pat. No. 5,823,031 the bending of the tube is not performed under the action of an axial pull tension. The production of an A-column of a motor vehicle with the reinforcement region is not possible with the solution of U.S. Pat. No. 5,823,031.

It is an object of the present Invention to furnish a method for the production of a hollow form part.

SUMMARY OF THE INVENTION

1. Purposes of the Invention

It is an object of the Invention to develop a method of production of a hollow molded part made out of a metallic material in the form of an A-column for a motor vehicle, which hollow molded part can be produced out of a minimum number of component parts.

These and other objects and advantages of the present invention will become evident from the description which follows.

2. Brief Description of the Invention

The present invention provides a method for producing a hollow molded part made out of a metallic material in the form of an A-column for a motor vehicle with closed cross-section and a reinforcement.

This object is accomplished with the features of the patent claims and further features result from the subclaims. The A-column is produced out of a mold blank by inner high pressure metal forming and exhibits here a closed cross-section and a reinforcement and is formed as a single part with the reinforcement.

The second conical region and as far as present also the third region are reduced in their diameter here by a radial or tangential deformation method in comparison to the first region. This is accomplished preferably by hammering, forging, rotary kneading, swaging, rolling, flow turning or stretch forming.

The hollow molded part is bent in the second conical region for production of an A-column of a vehicle body.

It is for the first time possible based on the wall thickness increase in the reduced region to produce a single part A-column. A blank mold is generated by rotary kneading out of a tubular starting part with a starting wall thickness for production of an A-column, wherein the blank mold exhibits a region with an a starting diameter, a conical region (narrowing in diameter) and a cylindrical region, following and having a reduced diameter, wherein the wall thickness is increased in the conical region and in the diameter reduced region relative to and in comparison with the starting wall thickness. The mold blank is in the following bent in the conical region (preferably subject to axial tensile stress).

Finally the A-column is produced by inner high-pressure metal forming. Several intermediate deformation stages can be performed prior to the bending and/or prior to the inner high-pressure metal forming. It is also possible to intermediately anneal the in part produced workpiece prior to the inner high-pressure metal forming.

Larger loads in the crash case can be taken based on the increased wall thickness in the conical region also with single part formation.

The advantages of an increased strength and an increased wall thickness in the deformation region, of a relative smooth surface, of a favorable course of the fibers, as well as of time savings and material savings appear by employing round kneading, where round kneading is a chipless and shavingless deformation process for reducing the cross-section of rods, tubes and wires.

The materials employed for production of the hollow mold part according to the present invention include steel, stainless steel, non-iron metals and/or alloys.

The Invention is illustrated in more detail in the following based on the embodiment examples and associated drawings.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention:

There is shown in:

FIG. 1: a side elevational view of a tubular starting part for production of a hollow molded part in the shape of an A-column, FIG. 2: a sectional view of a mold blank for production of a hollow molded part in, the shape of an A-column, FIG. 3: blank mold, which had been bent, FIG. 4: an A-column produced from a blank mold by an inner high-pressure metal forming process.

FIG. 1 shows the tubular starting part A with a starting outer diameter D1, which tubular starting part A serves for example for production of an A-column of a vehicular body. A first mold blank V1 for further production of the hollow molded part in the shape of an A-column was generated for example by rotary kneading in a round kneading machine according to FIG. 2. The A-column exhibits a cylindrical first region 1 with the length L1, wherein the diameter of the cylindrical first region 1 corresponds to the starting outer diameter D1 and which first region 1 has a starting wall thickness b1. There follows a second region 2 of a length L2, wherein the outer diameter reduces conically up to the outer diameter D2. The angle α depends here on the starting outer diameter D1, on the outer diameter D2 and on the length L2 of the region 2. The following third region is formed cylindrical and is reduced to the diameter D2 over a length L3. The wall thickness b2 of the following third region 3 and also the wall thickness not designated in detail for the second region are increased in comparison to the starting wall thickness b1. The wall thickness of the second region corresponds to the wall thickness b1 or, respectively, b2 in the transition areas to the regions 1 or, respectively, 3.

The first mold blank V1 is now bent to a second mold blank V2 (FIG. 3) according to the required curvature of the A-column, wherein the bending radius R is disposed in the second region. Finally, the final forming of A-column S (FIG. 4) is performed by inner high-pressure metal forming as applied to the second mold blank V2. Several intermediate deformation stages (not illustrated) can be performed previously and possibly an annealing treatment can be performed. The finished A-column S (FIG. 4) exhibits now in the region of the bending (previously region 2) and in the following region directed toward the roof of the vehicle (previously region 3) an increased wall thickness b2 as compared with the wall thickness b1 in the region 1, wherein the increased wall thickness operates as a reinforcement and whereby further internally disposed or from the outside applied additional reinforcement parts can be dispensed with.

The dimensions of the mold blank V illustrated in FIG. 2 can assume thereby the following dimensions:

starting diameter D1: from about 80 mm to 160 mm, outer diameter D2: from about 0.4 to 0.7 times the size of the starting, diameter D1, starting wall thickness b1: from about 2.0 mm to 5.0 mm, wall thickness b2: from about 0.4 to 0.7 times the starting wall thickness b1, length L1: from about 1000 mm to 2500 mm, length L2: from about 200 to 1000 mm, length L3: from about 500 mm to 1500 mm, and angle α=f(L2, D2, D1)=from about 10 degrees to 85 degrees.

It is to be noted at this point that in addition to the recited dimensions also mold blanks or, respectively hollow mold parts can be produced having a total length (L1+L2+L3) of from about 30 mm to 50 mm.

It will be understood that each of the elements described above, or two or more together, may also find a useful application in other types of A-column configurations and A-column production procedures differing from the types described above.

While the invention has been illustrated and described as embodied in the context of an A-column, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Method for production of a hollow molded part made of a metallic material and having a shape of an A-column of a motor vehicle and produced out of a tubular starting part (A) having a starting outer diameter (D1) and a starting wall thickness (b1), characterized in that initially the tubular starting part (A) maintains a first cylindrical region (1) and is reduced by a radial or tangential deformation method in at least a second region (2) conically with an angle (α) and in at least a third region (3) cylindrically to a smaller diameter (D2) and thereby forming a mold blank (V) having an increased wall thickness (b2) relative to the starting wall thickness (b1) in the second region (2) and in the third region (3);

then bending the mold blank (V) in the second region (2) according to a required curvature for thereby forming an A-column;

performing a final forming of the A-column by inner high pressure metal forming of the mold blank (V) in the first region and/or in the second region;

maintaining a cylindrical form of the first cylindrical region; and accepting large loads in a crash case of the motor vehicle based on increased wall thickness of the A-column in the tapered central portion (2) and based on a single piece construction of the A-column.

2. The method according to claim 1 characterized in that a bending of the mold blank (V) is performed in the second conical region (2) under axial pull tension.

3. The method according to claim 1 characterized in that an intermediate annealing of the mold blank (V) is performed prior to the inner high pressure metal forming and wherein the radial or tangential deformation is performed by rolling.

4. The method according to claim 1 characterized in that an intermediate annealing of the mold blank (V) is performed between the step of the radial or tangential deformation method and the step of inner high pressure metal forming.

5. The method according to claim 1 characterized in that the step of the radial or tangential deformation is performed by hammering.

6. The method according to claim 1 characterized in that
the mold blank (V) is generated from the tubular starting part having a starting outer diameter (D1) of from 80 mm to 160 mm, and having a starting wall thickness (b1) of from 2.0 mm to 5.0 mm;
wherein a first region (1) of the mold blank (V) has an outer diameter corresponding to the starting outer diameter (D1) and a wall thickness corresponding to the starting wall thickness (b1) and wherein the first region (1) exhibits a length (L1) of from 800 mm to 2500 mm;
wherein a second conical region (2) of the mold blank (V) exhibits an angle α of from 10 degrees to 85 degrees and a length (L2) of from 100 mm to 1000 mm; and
wherein a third region (3) of the mold blank (V) is reduced to an outer diameter (D2) of from 0.4 times (D1) to 0.7 times (D1) and to a wall thickness (b2) of from (b1) divided by 0.7 to (b1) divided by 0.4 and exhibits a length (L3) of from 300 mm to 1500 mm.

7. A method for production of an A-column comprising forming a tubular starting part (A) having a starting outer diameter (D1) and a starting wall thickness (b1) and made out of a metallic material;
maintaining a first region (1) of cylindrical form of the tubular starting part (A);
initially reducing the tubular starting part (A), by a radial or tangential deformation method in at least a second region (2) conically with an angle (α) and in at least a third region (3) cylindrically to a smaller diameter (D2) and thereby forming a mold blank (V) having an increased wall thickness (b2) relative to the starting wall thickness (b1) in the second region (2) and in the third region (3);
then bending the mold blank (V) in the second region (2) according to a required curvature for thereby forming an A-column;
maintaining the cylindrical form of the first region (1); and
performing a final forming of the A-column by inner high pressure metal forming of the mold blank (V) in the first region and/or in the second region for forming the A-column of a motor vehicle.

8. The method according to claim 7 wherein bending the mold blank (V) in the second region (2) is performed under axial pull tension.

9. The method according to claim 7 further comprising intermediately annealing the mold blank (V) prior to the inner high pressure metal forming.

10. The method according to claim 7 further comprising intermediately annealing the mold blank (V) between the step of the radial or tangential deformation method and the step of inner high pressure metal forming.

11. The method according to claim 7 wherein the step of the radial or tangential deformation is performed by hammering, forging swaging, rotary kneading, rolling, flow turning, or stretch forming.

12. The method according to claim 7 further comprising generating the mold blank (V) from the tubular starting part having a starting outer diameter (D1) of from 80 mm to 160 mm, and having a starting wall thickness (b1) of from 2.0 mm to 5.0 mm;
wherein the first region (1) of the mold blank (V) has an outer diameter corresponding to the starting outer diameter (D1) and a wall thickness corresponding to the starting wall thickness (b1) and wherein the first region (1) exhibits a length (L1) of from 800 mm to 2500 mm;
wherein the second region (2) of the mold blank (V) exhibits an angle α of from 10 degrees to 85 degrees and a length (L2) of from 100 mm to 1000 mm; and
wherein the third region (3) of the mold blank (V) is reduced to an outer diameter (D2) of from 0.4 times (D1) to 0.7 times (D1) and to a wall thickness (b2) (b1) divided by 0.7 to (b1) divided by 0.4 and exhibits a length (L3) of from 300 mm to 1500 mm.

13. A method of producing an A-column for motor vehicles comprising
furnishing a tubular starting part (A) having a starting outer diameter (D1) and a starting wall thickness (b1) and made out of a metallic material and having a first cylindrical end portion, a central portion, and a second cylindrical end portion;
forming the central portion to be tapered with an angle (α) and forming the second end portion (3) cylindrically of reduced diameter (D2) by a radial or tangential deformation method, wherein the central portion connects the first cylindrical end portion to the second cylindrical end portion and thereby obtaining a mold blank (V) having an increased wall thickness (b2) relative to the starting wall thickness (b1) in the tapered central portion (2) and in the second cylindrical end portion (3);
bending the mold blank (V) only in the central portion (2) according to a required curvature for thereby forming a bent mold blank (V);
maintaining a cylindrical form of the first cylindrical end portion, and finishing the bent mold blank (V) by means of at least one forming step carried out by inner high pressure metal forming of the bent mold blank (V) in the first end portion and/or in the central portion thereby forming an A-column of a motor vehicle.

14. The method of producing an A-column according to claim 13 further comprising
incorporating the A-column next to a front window of a motor vehicle.

15. The method of producing an A-column according to claim 14 further comprising
accepting large loads in a crash case of the motor vehicle based on increased wall thickness of the A-column in the tapered central portion (2) and based on a single piece construction of the A-column and wherein the radial or tangential deformation is performed by flow turning.

16. The method of producing an A-column according to claim 13 further comprising
forming the A-column as a single part out of the tubular starting part (A) and wherein the radial or tangential deformation is performed by stretch forming.

17. The method for producing an A-column according to claim 13 wherein the radial or tangential deformation is performed by forging.

18. The method for producing an A-column according to claim 13 wherein the radial or tangential deformation is performed by swaging.

19. The method for producing an A-column according to claim 13 wherein the radial or tangential deformation is performed by hammering, forging swaging, rotary kneading, rolling, flow turning, or stretch forming.

* * * * *